(12) United States Patent
Leow

(10) Patent No.: US 11,301,057 B2
(45) Date of Patent: *Apr. 12, 2022

(54) LIFT DETECTION METHOD FOR MOUSE AND APPARATUS THEREOF

(71) Applicant: PixArt Imaging Inc., Hsin-Chu (TW)

(72) Inventor: Chun Heap Leow, Penang (MY)

(73) Assignee: PixArt Imaging Inc., Hsin-Chu (TW)

( * ) Notice: Subject to any disclaimer, the term of this patent is extended or adjusted under 35 U.S.C. 154(b) by 0 days.

This patent is subject to a terminal disclaimer.

(21) Appl. No.: 17/308,061

(22) Filed: May 5, 2021

(65) Prior Publication Data
US 2021/0382565 A1 Dec. 9, 2021

Related U.S. Application Data

(63) Continuation of application No. 16/892,226, filed on Jun. 3, 2020, now Pat. No. 11,029,765.

(51) Int. Cl.
*G06F 3/03* (2006.01)

(52) U.S. Cl.
CPC ................... *G06F 3/0325* (2013.01)

(58) Field of Classification Search
CPC ...... G06F 3/0325; G06F 3/0317; G06F 3/038; G06F 3/03543
See application file for complete search history.

(56) References Cited

U.S. PATENT DOCUMENTS

| | | | |
|---|---|---|---|
| 6,281,882 B1 * | 8/2001 | Gordon | G06F 3/0317 345/158 |
| 11,029,765 B1 * | 6/2021 | Leow | G06F 3/038 |
| 2002/0190953 A1 * | 12/2002 | Gordon | G06F 3/0346 345/166 |
| 2007/0290991 A1 * | 12/2007 | Bieber | G06F 3/0383 345/157 |
| 2010/0060488 A1 * | 3/2010 | DePue | G06F 3/0317 341/20 |
| 2011/0074676 A1 * | 3/2011 | Gao | G06F 3/03545 345/158 |
| 2011/0310018 A1 * | 12/2011 | Song | G06F 3/0312 345/166 |
| 2012/0038554 A1 * | 2/2012 | Wu | G06F 3/03543 345/166 |
| 2013/0215257 A1 * | 8/2013 | Huang | G06F 3/0325 348/86 |
| 2019/0033992 A1 * | 1/2019 | Morier | G06F 3/0304 |
| 2019/0079584 A1 * | 3/2019 | Bonanno | G06F 3/016 |
| 2020/0147481 A1 * | 5/2020 | Soelberg | G06F 3/0383 |

* cited by examiner

*Primary Examiner* — Amit Chatly
(74) *Attorney, Agent, or Firm* — Winston Hsu

(57) ABSTRACT

An optical mouse includes a pixel array and a light source. A method for determining when the optical mouse is in a lifted condition above a surface includes: accumulating pixel values of a first column of the pixel array, the first column being closest to the light source; accumulating pixel values of a second column of the pixel array, the second column being different from the first column; comparing the accumulated pixel values of the first column with the accumulated pixel values of the second column; and when a difference between the accumulated pixel values of the first column and the accumulated pixel values of the second column is greater than a threshold value, determining the optical mouse to be in a lifted condition.

4 Claims, 4 Drawing Sheets

LIFT DETECTION METHOD FOR MOUSE AND APPARATUS THEREOF

CROSS REFERENCE TO RELATED APPLICATIONS

This application is a Continuation Application of U.S. application Ser. No. 16/892,226 filed on Jun. 3, 2020, the contents of which are included by reference.

BACKGROUND OF THE INVENTION

1. Field of the Invention

This invention relates to an optical gaming mouse, and more particularly, to a lift detection method for an optical gaming mouse, which can determine a lift off condition of the mouse to a high degree of accuracy.

2. Description of the Prior Art

The optical mouse has largely replaced the mechanical mouse for most computer applications. As an optical mouse has fewer moving parts, there is less likelihood of wear and tear. The optical mouse also has high cursor accuracy, meaning it can provide precise location feedback, making it very suitable for gaming applications. Further, the optical mouse can be used on many surfaces. Surfaces with high reflectivity can provide inaccurate results, however. A parameter called 'squal' (which stands for 'surface quality') is used to describe a surface on which the mouse is used. High surface squal typically indicates a dark and non-reflective surface, whereas low surface squal indicates a light and/or highly reflective surface.

Refer to FIG. 1, which is a diagram of a standard optical mouse 100. The optical mouse 100 comprises a wheel 110, for scrolling, allowing a cursor shown on a display screen of a computer (not shown) to be moved accordingly. Internally, the optical mouse 100 comprises an LED 120, for generating a light which is directed via a prism 130 out of an emitter 140, and is projected onto a surface 200. The light is then reflected back to the optical mouse 100 into a pixel array 150, which uses the reflected light to determine movement of the optical mouse 100.

When playing computer games, fast reactions combined with display input heighten the experience. A gaming mouse has increased reaction times with comparison to a standard desktop mouse. Movement must therefore be determined quickly. In particular, distinction must be made between the mouse being on a gaming surface, and the mouse being lifted. Current techniques require the mouse to be lifted by 1 mm or more above the gaming surface in order to determine that a lift has occurred, which reduces reaction times seen on a gaming interface, and can result in incorrect inputs from the mouse.

If a lift condition can be determined more precisely and at a closer distance to a surface, user experience can be heightened.

SUMMARY OF THE INVENTION

It is therefore an objective of the invention to provide a lift detection method for a gaming mouse which has high accuracy and precision.

An optical mouse comprises a pixel array and a light source. A method for determining when the optical mouse is in a lifted condition above a surface comprises: accumulating pixel values of a first column of the pixel array, the first column being closest to the light source; accumulating pixel values of a second column of the pixel array, the second column being different from the first column; comparing the accumulated pixel values of the first column with the accumulated pixel values of the second column; and when a difference between the accumulated pixel values of the first column and the accumulated pixel values of the second column is greater than a threshold value, determining the optical mouse to be in a lifted condition.

The second column may be a column of the pixel array farthest from the light source or may be any other column of the pixel array apart from the column farthest from the light source. When a difference between the accumulated pixel values of the first column and the accumulated pixel values of the second column is less than or equal to a threshold value, the mouse is determined to be in an unlifted condition.

These and other objectives of the present invention will no doubt become obvious to those of ordinary skill in the art after reading the following detailed description of the preferred embodiment that is illustrated in the various figures and drawings.

DETAILED DESCRIPTION

As detailed in the background, squal of a gaming surface can affect the light received by the pixel array 150. A standard optical mouse can measure the surface quality (Psqual) as well as an average pixel value of a sensor array (Pavg) and a maximum pixel value of said sensor array (Pmax). By using these measured values and comparing them to predetermined thresholds, a determination can be made as to whether an optical mouse is on a gaming surface.

Figure 1:
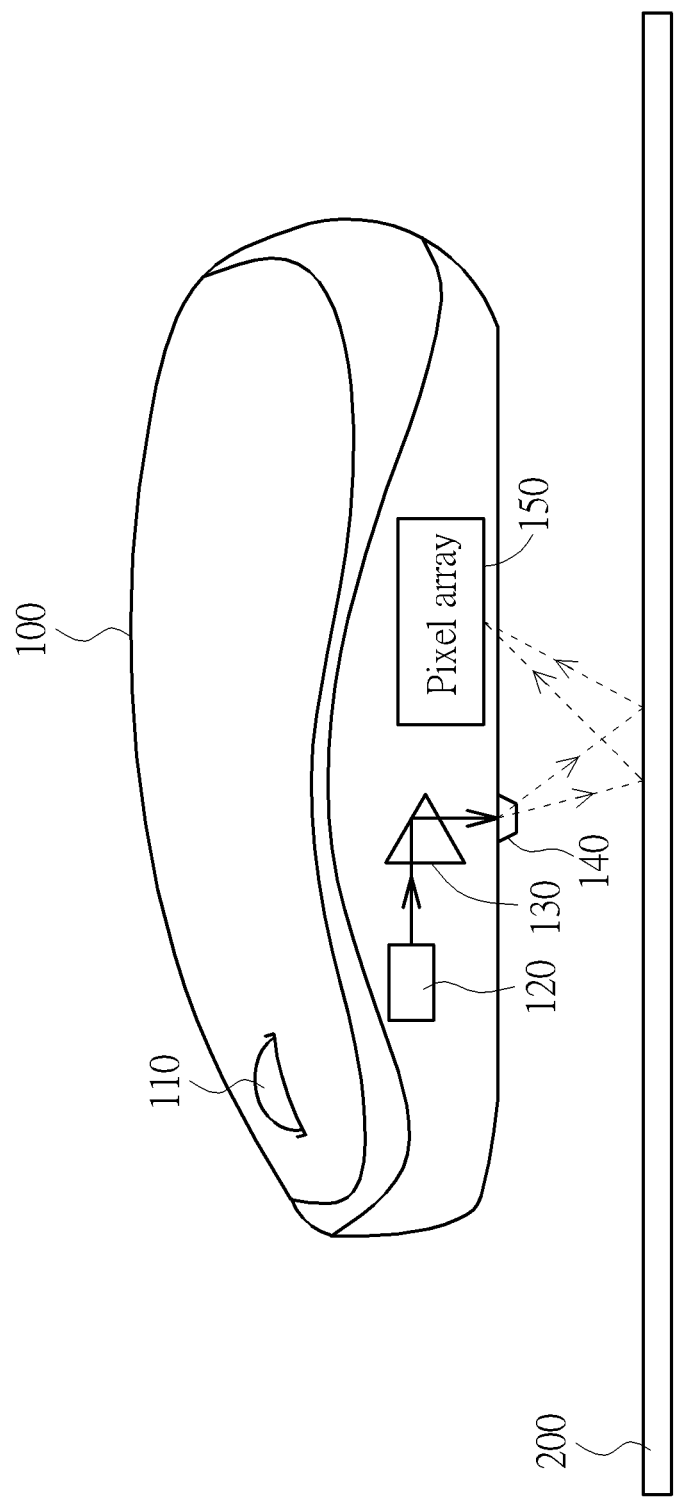
FIG. 1 is a diagram of an optical mouse according to the related art.

The following thresholds are predetermined:

PsqualTH1=Maximum squal threshold for high squal surface
PsqualTH2=Minimum squal threshold for high squal surface
PsqualTH3=Minimum squal threshold for low squal surface
PmaxavgTH2=Threshold value for Pmax−Pavg on high squal surface
PmaxavgTH3=Threshold value for Pmax−Pavg on low squal surface
PavgTH3=Minimum pixel average on low squal surface By comparing the above thresholds with Psqual, Pavg and Pmax, it can be determined if an optical mouse (such as the optical mouse 100 shown in FIG. 1) is on a surface. The on surface detection can be categorized into three conditions corresponding to: the optical mouse being on a high squal surface; the optical mouse being on a high squal surface but having a low pixel average; and the optical mouse being on a low squal surface but having a high pixel average.

Initially, Psqual is compared to PsqualTH1, wherein if Psqual>PsqualTH1, the optical mouse satisfies the first condition and is determined to be on a high squal surface.

If Psqual<PsqualTH1, Psqual is then compared to PsqualTH2, and Pmax−Pavg is compared to PmaxavgTH2. If Psqual>PsqualTH2 and Pmax−Pavg>PmaxavgTH2, then the optical mouse satisfies the second condition and is determined to be on a high squal surface with a low pixel average.

If the above determinations are not satisfied, Psqual is then compared to PsqualTH3, Pmax−Pavg is compared to PmaxavgTH3, and Pavg is further compared to PavgTH3. If Psqual<PsqualTH3, Pmax−Pavg<PmaxavgTH3, but Pavg>PavgTH3 then the optical mouse satisfies the third condition and is determined to be on a low squal surface with a high pixel average.

Figure 4:
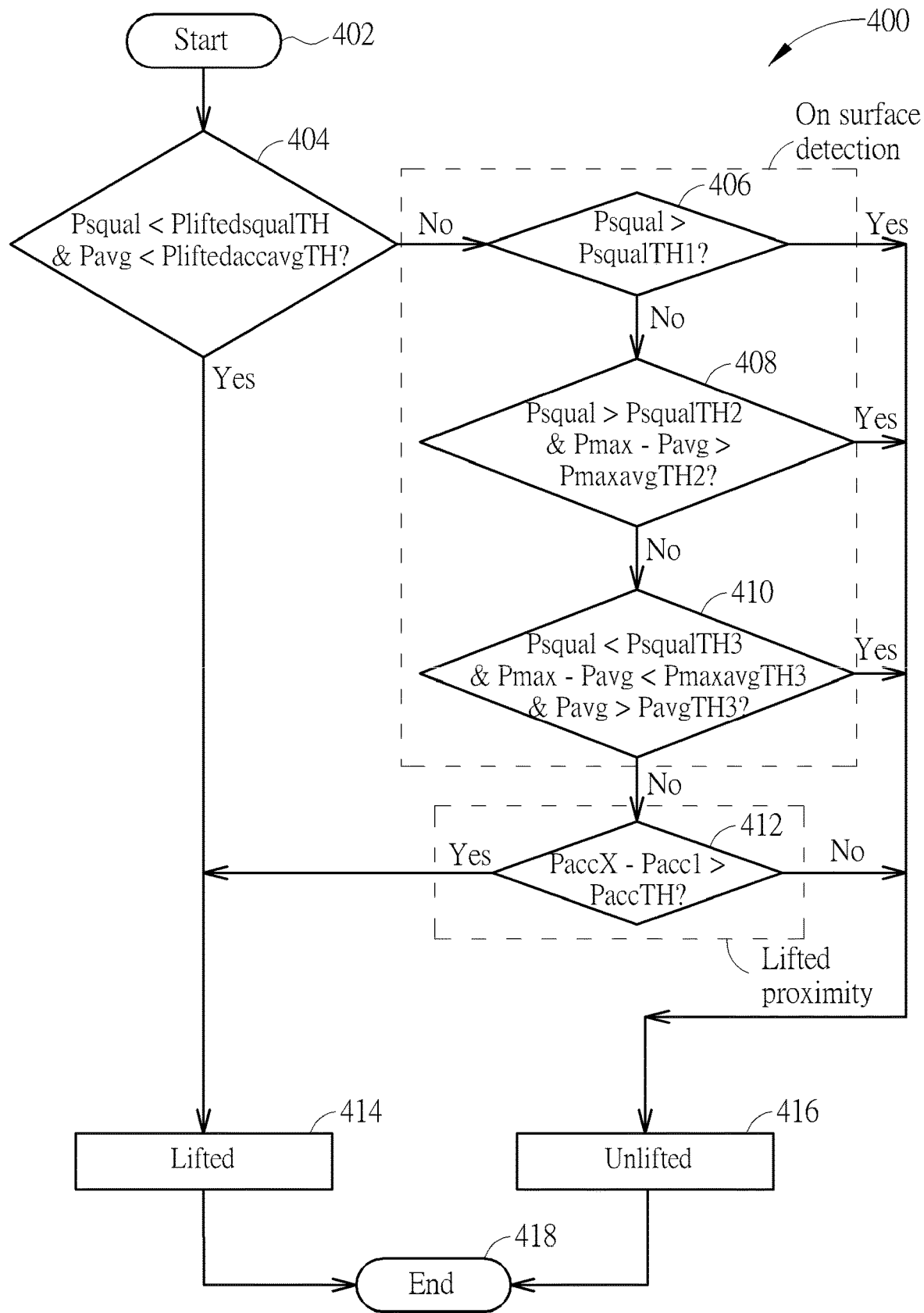
FIG. 4 is a flowchart illustrating a method according to an exemplary embodiment of the present invention.

The above three comparison steps respectively correspond to Step 406, Step 408 and Step 410 shown in FIG. 4. These steps are surrounded by a dashed line and labeled 'On surface detection'. In the method shown in FIG. 4, before the on surface detection stage is entered, Step 404 is performed. Step 404 is for determining whether the mouse is in a lifted condition. This is determined by comparing Psqual with a threshold value PliftedsqualTH (Psqual<PliftedsqualTH), and further comparing Pavg with a threshold value PliftedaccavgTH (Pavg<PliftedaccavgTH). These two values can be determined experimentally, or be set according to standard parameters. If neither condition is satisfied, the method enters the on surface detection phase.

It is possible, however, that the mouse has been lifted, but has not been lifted far enough for Step 404 to accurately determine this to be true. The present invention therefore provides a method for determining when the optical mouse is lifted, even when Step 404 is not satisfied.

Figure 2:
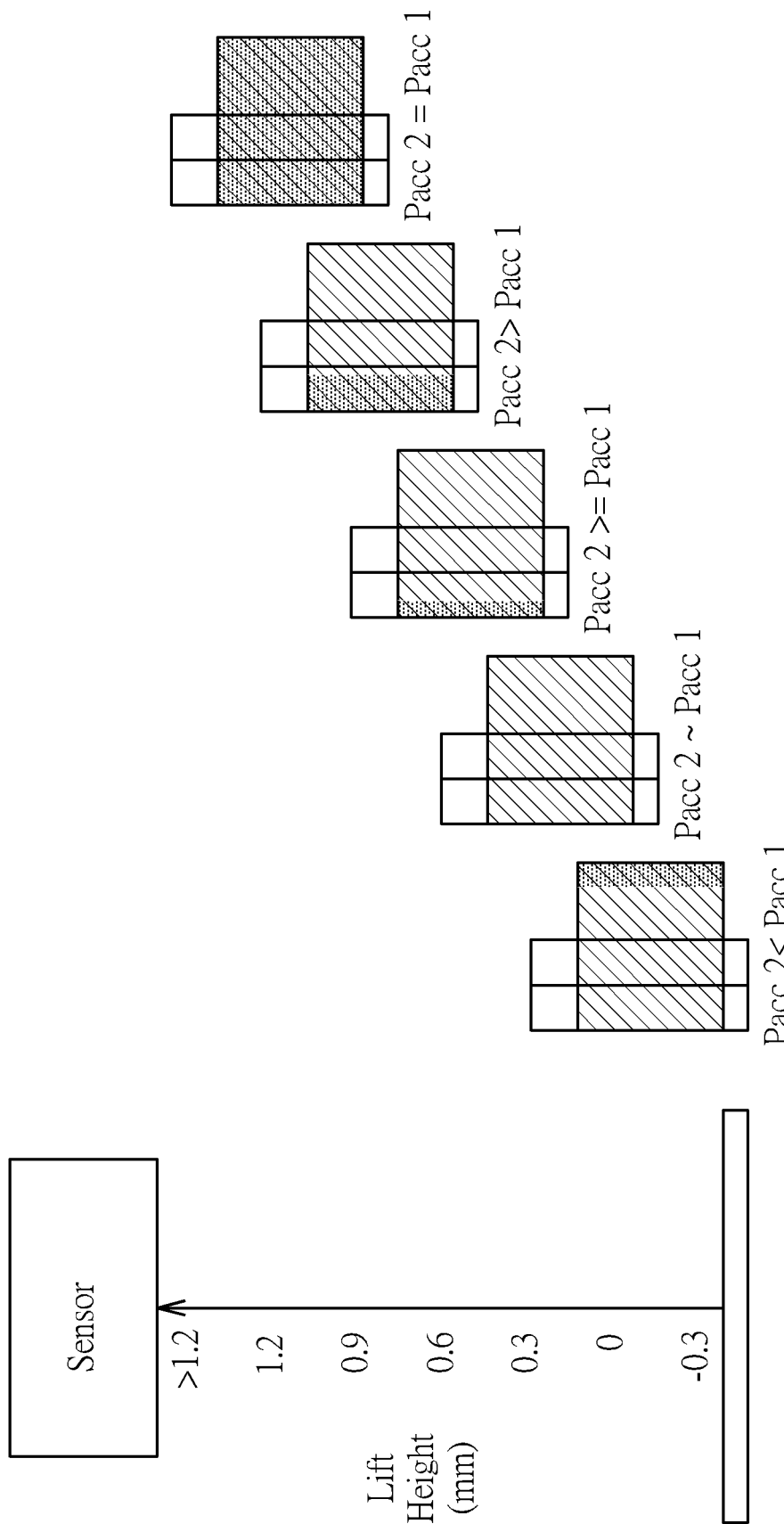
FIG. 2 is a diagram of a sensor array of the optical mouse shown in FIG. 1 at various heights above a surface.

This is illustrated in FIG. 2. FIG. 2 shows a pixel array of an optical mouse (for example, the optical mouse 100 shown in FIG. 1), and how the pixel array changes at different heights above the surface. When the mouse is on the surface, the accumulated pixel values of the pixel array column closest to the light source will be less than the accumulated pixel values of a pixel array column farther from the light source. In FIG. 2, two adjacent columns are shown as an example. At a point on or very close to the surface, the accumulated pixel values of both columns will be similar, i.e. the image is equally bright across the entire pixel array. As the optical mouse is lifted farther from the surface, the accumulated pixel values of the pixel array column closest to the light source start to become greater than the accumulated pixel values of the pixel array column farther from the light source, i.e. the image is darker closer to the light source. At a certain distance above the surface, the accumulated pixel values of both columns will again be similar or equal to each other, but in this case the entire image will be dark.

Therefore, by accumulating pixel values of a pixel array column closest to the light source and accumulating pixel values of a pixel column farther from the light source and determining the difference between the two, it can be determined whether the mouse is in a lifted condition or not. This is called Lifted Proximity technique.

Lifted Proximity uses the pixel array and the LED light source of the mouse sensor. If a pixel array is defined as having a plurality of columns 1~x, arranged in rows, wherein the number of rows may be less than, equal to or greater than x, the distance from the surface can be determined by comparing a value of column 1 being closest to the light source and column x being farthest from the light source. By measuring a difference between the two and comparing said difference to a threshold, it can be determined whether the mouse is lifted.

Figure 3:
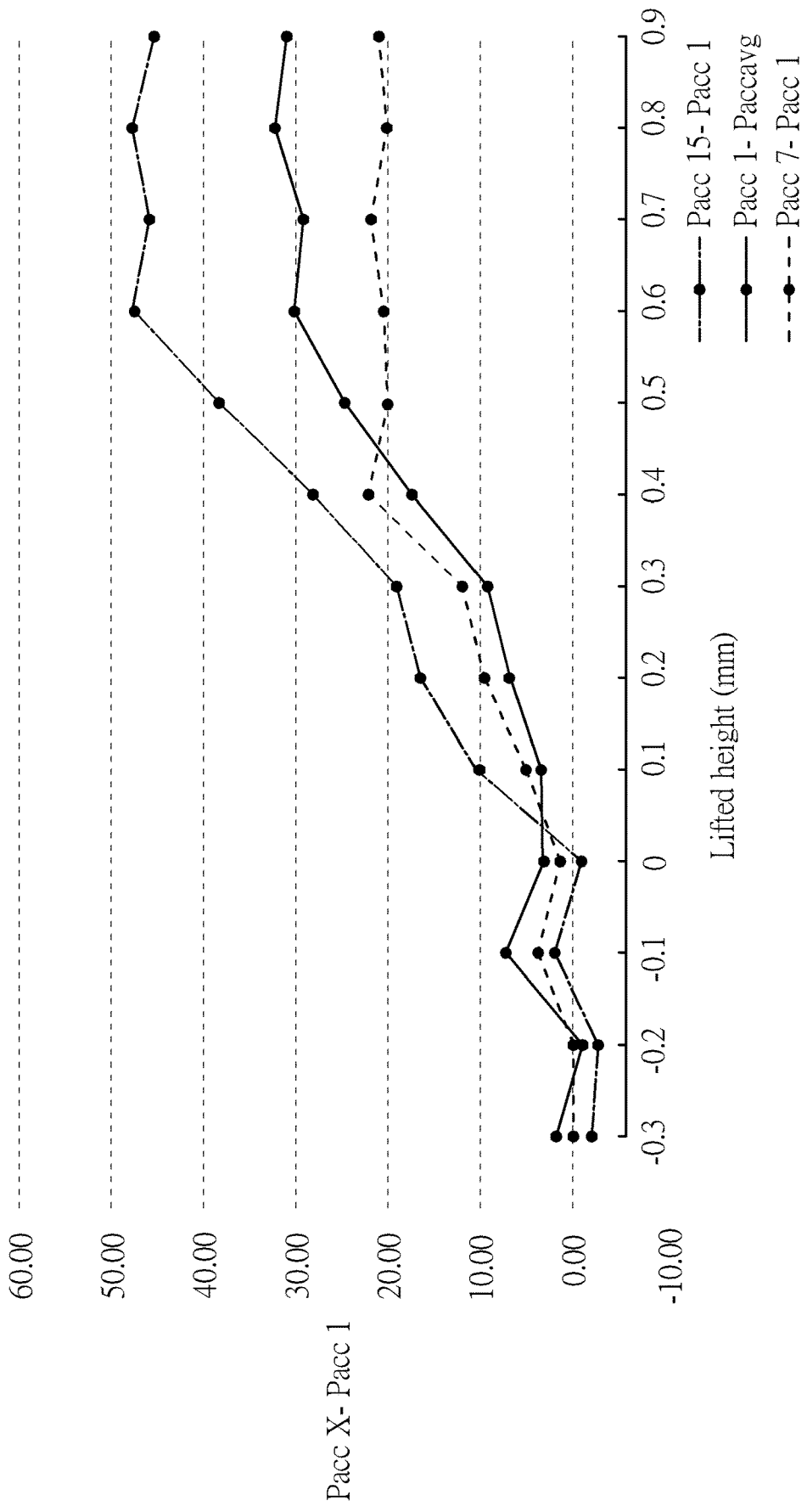
FIG. 3 is a graph illustrating the difference between accumulated pixel values of a first column and a second column of a sensor array vs. lifted height above a surface.

Refer to FIG. 3 for an illustration of the above. FIG. 3 shows the difference between accumulated pixel values of two different columns of a pixel array plotted against lifted height (in mm). In the graph shown in FIG. 3, the x axis is lifted height (mm) and the y axis is PaccX−Pacc1, wherein Pacc1 is the pixel column closest to the light source. Three examples of PaccX are given. The dashed line shows PaccX as Pacc7, i.e. the seventh column of the pixel array. The solid and dashed line shows PaccX as Pacc15, i.e. the fifteenth column of the pixel array. The solid line shows PaccX as Paccavg, i.e. an average value of all pixels of the array. As shown in the diagram, at a lifted height of approximately 0.5 mm, PaccX−Pacc1 is above 20 for all three lines. In this example, a threshold PaccTH is defined as 20, meaning that a lifted condition can be detected at 0.5 mm above surface height.

As shown in FIG. 2, at some point above the surface, the mouse will enter a condition wherein the image simply becomes dark. If only the accumulated column values were used to determine lifted vs. unlifted conditions, this could be confused with an on surface condition as both accumulated pixel columns will be approximately equal to each other (i.e. PaccX=Pacc1, therefore PaccX−Pacc1<PaccTH). When the image is completely dark, however, Psqual will be close to zero and the pixel average (Pavg) will be almost zero. As the method of the present invention has already used the comparisons Psqual<PliftedsqualTH and Pavg<PliftedaccavgTH in Step 404, it can be known that when PaccX−Pacc1<PaccTH, this corresponds to the mouse being in an unlifted condition.

The above method is shown in FIG. 4. The steps are detailed below.

Step 402: Start;

Step 404: Psqual<PliftedsqualTH & Pavg<PliftedaccavgTH? If no, go to Step 406; if yes, go to Step 414;

Step 406: Psqual>PsqualTH1? If yes, go to Step 416; if no, go to Step 408;

Step 408: Psqual>PsqualTH2 & Pmax−Pavg>PmaxavgTH2? If yes, go to Step 416; if no, go to Step 410;

Step 410: Psqual<PsqualTH3 & Pmax−Pavg<PmaxavgTH3 & Pavg>PavgTH3? If yes, go to Step 416; if no, go to Step 412;

Step 412: PaccX−Pacc1>PaccTH? If no, go to Step 416; if yes, go to Step 414;

Step 414: Mouse is in a lifted condition;

Step 416: Mouse is in an unlifted condition;

Step 418: End.

The present invention can therefore accurately and quickly determine when a mouse is in a lifted condition with greater precision than the prior art. Moreover, the method of the present invention can distinguish when a mouse is in a lifted condition far from a surface and when a mouse is on a surface, by utilizing accumulated pixel values. Therefore, the method of the present invention does not require altering the mouse circuitry or complicated algorithms.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for determining when an optical mouse is in a lifted condition above a surface, the optical mouse comprising a pixel array and a light source, the method comprising:
   accumulating pixel values of a first column of the pixel array, the first column being closest to the light source;
   accumulating pixel values of a second column of the pixel array, the second column being different from the first column;
   comparing the accumulated pixel values of the first column with the accumulated pixel values of the second column; and
   when a difference between the accumulated pixel values of the first column and the accumulated pixel values of the second column is greater than a threshold value, determining the optical mouse to be in a lifted condition.

2. The method of claim 1, wherein the second column is a column of the pixel array farthest from the light source.

3. The method of claim 1, wherein the second column is any column of the pixel array apart from the column farthest from the light source.

4. The method of claim 1, further comprising:
   when a difference between the accumulated pixel values of the first column and the accumulated pixel values of the second column is less than or equal to a threshold value, determining the optical mouse to be in an unlifted condition.

* * * * *